(12) United States Patent
Sandberg et al.

(10) Patent No.: US 11,176,058 B2
(45) Date of Patent: Nov. 16, 2021

(54) ADDRESS DECRYPTION FOR MEMORY STORAGE

(71) Applicant: Arm Limited, Cambridge (GB)

(72) Inventors: Andreas Lars Sandberg, Cambridge (GB); Derek Del Miller, Austin, TX (US)

(73) Assignee: Arm Limited, Cambridge (GB)

( * ) Notice: Subject to any disclaimer, the term of this patent is extended or adjusted under 35 U.S.C. 154(b) by 24 days.

(21) Appl. No.: 16/749,006

(22) Filed: Jan. 22, 2020

(65) Prior Publication Data

US 2021/0224201 A1 Jul. 22, 2021

(51) Int. Cl.
*G06F 12/14* (2006.01)
*H04L 9/32* (2006.01)
*H04L 9/08* (2006.01)
*H04L 9/30* (2006.01)

(52) U.S. Cl.
CPC ........ *G06F 12/1408* (2013.01); *H04L 9/3263* (2013.01); *G06F 2212/1052* (2013.01); *G06F 2212/402* (2013.01); *H04L 9/0816* (2013.01); *H04L 9/0825* (2013.01); *H04L 9/0833* (2013.01); *H04L 9/0844* (2013.01); *H04L 9/0866* (2013.01); *H04L 9/30* (2013.01); *H04L 9/32* (2013.01); *H04L 9/3271* (2013.01)

(58) Field of Classification Search
CPC ......... G06F 12/1408; G06F 2212/1052; G06F 2212/402; H04L 9/0816; H04L 9/0825; H04L 9/0833; H04L 9/0844; H04L 9/0866; H04L 9/30; H04L 9/32; H04L 9/3263; H04L 9/3271

USPC ........................................................ 711/163
See application file for complete search history.

(56) References Cited

U.S. PATENT DOCUMENTS

| | | | |
|---|---|---|---|
| 10,778,450 B1* | 9/2020 | Griffin ................... | H04L 9/0861 |
| 2007/0016799 A1* | 1/2007 | Klint ....................... | G06F 21/79 |
| | | | 713/189 |
| 2007/0127719 A1* | 6/2007 | Selander ............... | H04L 9/0891 |
| | | | 380/277 |
| 2008/0019528 A1* | 1/2008 | Kneissler .............. | H04L 9/0833 |
| | | | 380/279 |
| 2008/0077794 A1* | 3/2008 | Arnold .................. | H04L 9/0822 |
| | | | 713/169 |
| 2009/0150631 A1* | 6/2009 | Wilsey .................... | G06F 21/78 |
| | | | 711/163 |
| 2014/0173238 A1* | 6/2014 | Ware ....................... | G09C 1/00 |
| | | | 711/163 |

(Continued)

OTHER PUBLICATIONS

Barker, E. "Recommendation for Key Management—Part 1: General", Jan. 2016, NIST Special Publication 800-57 Part 1 Revision 4, pp. 18-19, 25-27, 88-96 (Year: 2016).*

*Primary Examiner* — Gurtej Bansal
*Assistant Examiner* — Aaron D Ho
(74) *Attorney, Agent, or Firm* — Nixon & Vanderhye P.C.

(57) ABSTRACT

An apparatus comprises memory storage circuitry comprising a plurality of memory storage locations to store data; an interface to receive an address from a requester; decryption circuitry to obtain a decrypted address by decrypting, based on a decryption key, an address received from the requester; and access control circuitry to select, based on the decrypted address obtained by the decryption circuitry, a memory storage location of the memory storage circuitry to be accessed.

17 Claims, 5 Drawing Sheets

(56) References Cited

U.S. PATENT DOCUMENTS

| | | | |
|---|---|---|---|
| 2016/0092702 A1* | 3/2016 | Durham | G06F 9/34 |
| | | | 713/190 |
| 2016/0301532 A1* | 10/2016 | Lim | G06F 12/1408 |
| 2018/0300261 A1* | 10/2018 | Narayanasamy | G06F 13/4282 |
| 2020/0125501 A1* | 4/2020 | Durham | H04L 9/0861 |
| 2020/0226074 A1* | 7/2020 | Durham | G06F 12/145 |

* cited by examiner

ADDRESS DECRYPTION FOR MEMORY STORAGE

BACKGROUND

Technical Field

The present technique relates to the field of memory storage.

Technical Background

A data processing system may have at least one memory module providing memory storage for storing data. The interface between the processor and the memory module may be vulnerable to an attacker monitoring data travelling across the interface. Therefore, some designs of processor may use encryption and integrity protection to protect the data being sent out to memory and data being read back against adversaries with hardware access to the interface. The data may be encrypted to prevent the plaintext data being accessible to the attacker. Also, integrity protection techniques may be applied to verify that when data is read back form memory, it is the same value that was originally written to the same location, in case an attacker may have tampered with the data while it was stored in the memory module. For example, integrity trees based on hashes and/or counters may be used to protect the data when it is stored in the memory module.

SUMMARY

Viewed from one example, the present technique provides an apparatus comprising: memory storage circuitry comprising a plurality of memory storage locations to store data; an interface to receive an address from a requester; decryption circuitry to obtain a decrypted address by decrypting, based on a decryption key, an address received from the requester; and access control circuitry to select, based on the decrypted address obtained by the decryption circuitry, a memory storage location of the memory storage circuitry to be accessed.

Viewed from one example, the present technique provides the system comprising the apparatus described above, and the requester.

Viewed from one example, the present technique provides an apparatus comprising: means for storing data, comprising a plurality of memory storage locations; means for receiving an address from a requester; means for obtaining a decrypted address by decrypting, based on a decryption key, an address received from the requester; and means for selecting a memory storage location to be accessed based on the decrypted address obtained by the decryption circuitry.

Viewed from one example, the present technique provides a method for controlling memory storage circuitry comprising a plurality of memory storage locations to store data; the method comprising: receiving an address from a requester; obtaining a decrypted address by decrypting, based on a decryption key, an address received from the requester; and selecting a memory storage location of the memory storage circuitry to be accessed based on the decrypted address.

Further aspects, features and advantages of the present technique will be apparent from the following description of examples, which is to be read in conjunction with the accompanying drawings.

DESCRIPTION OF EXAMPLES

Typical encryption and integrity protection techniques for protecting the interface to off-chip memory against adversaries with hardware access focus on data confidentiality and integrity, but do not protect the addresses issued by a requester to a memory storage module specifying the memory storage location to be accessed. However, the inventors recognised that in some cases an external attacker can gain information on the activity of the requester by observing the stream of addresses issued to the memory.

In the techniques discussed below, an apparatus has memory storage circuitry having a number of memory storage locations for storing data, and an interface to receive an address from a requester. Decryption circuitry is provided to obtain a decrypted address by decrypting, based on a decryption key, an address received from the requester over the interface. Access control circuitry selects, based on the decrypted address obtained by the decryption circuitry, a memory storage location of the memory storage circuitry to be accessed. Hence, by receiving the addresses on the interface in an encrypted form, and decrypting them at the memory storage, this eliminates the side channel by which an attacker can gain information about the activity of the requester and hence improves security.

This approach is surprising because one would not expect that it would be feasible to provide decryption capability with sufficient level of security in a typical memory storage module. With data encryption, the encryption and decryption operations can be performed at the requesting integrated circuit, and the already encrypted data can pass to the memory storage and be stored in memory exactly the same way as if no encryption was being applied by the requester. Hence, data encryption and integrity typically may not require any substantial modification of the hardware in a typical memory storage module, as the overhead of the encryption and integrity operations can be performed at the requester side instead.

However, for address encryption and decryption, since the decrypted address (in the clear) will be needed at the memory storage to select which memory storage location should be accessed, then it is not possible for the security mechanisms to be implemented solely at the requester, and so some decryption capability would be needed in the memory storage. Due to manufacturing limitations in typical memory storage technologies, it is generally very hard to provide sufficient processing logic in a memory storage integrated circuit to implement cryptographic components for decryption, which would be seen as a barrier to implementing address decryption at a memory storage module. Hence, although data encryption for off-chip memory is known, it would be considered surprising to extend this to also encrypt and decrypt the addresses that pass over the interface from the requester to the memory storage.

The apparatus comprises configuration circuitry to obtain the decryption key by performing a cryptographic key exchange procedure with the requester, and to provide the decryption key to the decryption circuitry. One reason for the added complexity of handling address encryption/decryption compared to data encryption/decryption is that, unlike for the data, with the address encryption/decryption this may need both the requester and the memory storage apparatus to agree on a shared key to be used for encrypting and decrypting the addresses, whereas for the data encryption it is possible to use an encryption key which is known only to the requesting integrated circuit. As typically memory storage modules may be made by one manufacturer and data processing integrated circuits which typically act as requesters to the memory storage module may be made by a different manufacturer, it is typically not practical for the decryption key (to be used for protecting the addresses over the interface) to be pre-shared and embedded in the hardware at the time of manufacture. As the same requester could be used with a number of different memory storage modules provided by different manufacturers, it may be desirable to be able to negotiate the particular decryption key to be used at the time when the requester and the memory storage are operational in the field. Hence, the configuration circuitry can perform a cryptographic key exchange procedure with the requester to obtain the decryption key which is to be used by the decryption circuitry for decrypting addresses received by the requester.

However, as mentioned above typically the memory storage locations of the memory module are provided on at least one memory storage integrated circuit which typically has very limited budget available for circuit logic. For example, we estimate that in a typical dynamic random access memory (DRAM) integrated circuit, the spare budget for logic gates may only be about 5,000-10,000 logic gates, which is typically not sufficient for handling a cryptographic key exchange procedure which may need more complex processing (requiring processing hardware with many more gates) to provide a sufficient level of security to protect against attackers. Hence, within the memory storage integrated circuit itself there is typically not enough space to implement the cryptographic primitives required for the requester to be able to authenticate the memory storage module to sufficient extent that it will trust it to receive a cryptographic key for decrypting addresses.

Hence, when the memory storage circuitry comprises at least one memory storage integrated circuit, the configuration circuitry may be provided on a configuration integrated circuit which is separate from the at least one memory storage integrated storage. By providing a separate integrated circuit designated for handling the cryptographic key exchange procedure, this enables more secure handling of the key exchange while addressing the constraints on logic budget that applies to memory storage integrated circuits in a typical memory module.

The decryption circuitry for decrypting the addresses may be provided on the at least one memory storage integrated circuit. As the interface between the memory storage integrated circuit and the configuration integrated circuit within the memory module may itself by vulnerable to an attacker with hardware access probing that interface, then the transmission of the decryption key from the configuration integrated circuit to the at least one memory storage integrated storage may itself be protected, by encrypting the decryption key based on a symmetric key shared between the configuration integrated circuit and the at least one memory storage integrated circuit. This symmetric key may be pre-shared between the configuration integrated circuit and the at least one memory storage integrated circuit at the time when the memory module is assembled at the manufacturing stage.

In one example the configuration circuitry may comprise a microcontroller. For example, while a typical memory module may have a number of memory storage integrated circuits and a passive read only memory which is used merely for providing configuration data (e.g. data defining information on the manufacturer of the memory module and timings for controlling memory access), in the approaches described below the memory module may be provided with an active processing unit which can execute program code, such as a microcontroller unit (MCU). This microcontroller can then be used to handle the cryptographic protocols used for the key exchange procedure to obtain the decryption key based on negotiation with the requester.

The cryptographic key exchange procedure may comprise an authentication procedure performed between the requester and the configuration circuitry to authenticate an identity of the apparatus comprising the memory storage or to authenticate an identity of a manufacturer of that apparatus. This authentication procedure may be based on asymmetric key cryptography, which may be any cryptographic protocol based on an asymmetric key pair comprising a private key accessible to the configuration circuitry and a public key which other parties can use to verify the identity of the apparatus. This may be based on a public key infrastructure (PKI). Implementing the cryptographic primitives for asymmetric key cryptography is expensive in terms of processor resource and hence requires a reasonable number of logic gates to implement, which is typically not practical in the memory storage integrated circuits typically provided in a memory storage module to provide the storage cells for actually storing the data. By using asymmetric key cryptography this provides greater security for the authentication compared to alternative techniques. Hence, the approach discussed above with the separate configuration circuitry on a different integrated circuit to the memory storage is particularly useful for helping support authentication based on a symmetric key cryptography.

For example, in the authentication procedure, the configuration circuitry may provide an authentication response based on a private key stored in local storage circuitry associated with the configuration circuitry, where the private key is verifiable using an attestation certificate providing a public key corresponding to the private key. The attestation certificate may be signed by the manufacturer of the memory storage apparatus or by a certifying authority associated with that manufacturer. Hence, the key exchange may depend on the authentication procedure being successful so that the certificate provided by the manufacturer or the certifying authority gives the requester sufficient trust that the module has been attested to be the trusted memory storage module associated with the corresponding private key. This avoids the requester exposing their data and addresses to an untrusted module (which may not be trusted not to leak data and addresses to an attacker). It will be appreciated that any known key exchange procedure or asymmetric authentication procedure may be used to negotiate the keys. For example, any known PKI protocol may be used for the authentication, and a secure key exchange procedure such as Diffie-Hellman key exchange could be used.

The configuration circuitry and/or the decryption circuitry may preserve the decryption key obtained in the cryptographic key exchange procedure in local storage circuitry, to enable subsequent addresses received from the requester on the interface to be decrypted without needing to repeat the full cryptographic key exchange procedure. The cryptographic key exchange procedure (including the authentication procedure) may be relatively slow and costly in terms of process or resource, so by preserving the decryption key this reduces the overhead on subsequent occasions to improve performance and save power. The decryption key may be preserved in the local storage across successive boot operations so that it is not necessary to perform the cryptographic key exchange procedure on each boot.

In implementations which enable a decryption key to be preserved across successive boot operations, then the requester may require trust that the memory module has not been exchanged for a different module between one boot and another. Hence, a challenge-response mechanism could be provided where, in response to a challenge request from the requester, the configuration circuitry may provide a challenge response for verifying to the requester that the apparatus is the same as the apparatus with which the requester previously performed the cryptographic key exchange procedure. For example, the decryption key previously negotiated could be used to encrypt a message sent back to the requester which the requester can then decrypt and verify that it matches the expected message to confirm that the memory storage apparatus still has the decryption key. Alternatively, during the cryptographic key exchange procedure some other piece of shared information can be exchanged and the configuration circuitry may, in its challenge response provide proof that it has the previously shared information. In this way, the requester can maintain trust in its interaction with the memory but it is not necessary to undergo the cryptographic key exchange procedure each time the system is booted.

In some examples the memory storage circuitry could comprise a single memory storage integrated circuit, combined with the configuration integrated circuit as discussed above.

However, in other examples the memory storage circuitry may have two or more memory storage integrated circuits, each of which has the decryption circuitry and the access control circuitry as described above. In this case, a single instance of the configuration integrated circuit could be shared among the respective memory storage integrated circuits so that the configuration integrated circuit provides the decryption key for each of those memory storage integrated circuits. While it may be possible for each memory storage integrated circuit to have its own different decryption key, in practice this may not be feasible as it would require the requester to know which memory storage integrated circuit will store the information for a given address, and the internal layout within the memory module may not be visible to the requester. Hence, in practice it may be sufficient for the two or more memory storage integrated circuits to each share the same decryption key for decrypting address received on the interface from the requester.

In some implementations, the memory storage apparatus need not have any resources for handling data encryption or decryption. This does not necessarily mean that the data is not being protected, however if any protection is being applied to the data then this may be done at the requesting integrated circuit, and the memory module can then simply receive the already encrypted data, store it to memory, and when requested read it out from memory and send the encrypted data back to the requester, where the requester can then handle any decryption of the data. Hence, in such embodiments the memory storage apparatus may have decryption circuitry for obtaining the decrypted address, but need not apply any decryption to the data received on the interface from the requester or encryption to the data transmitted to the requester over the interface.

However, in other examples it may be desirable for the memory module to also handle decryption and encryption of data on the interface. For example, recently there has been research into "in memory computation" where some relatively basic processing operations can be performed on data stored in memory within the memory module itself, rather than needing the data to be read out to a data processing integrated circuit to perform the data processing there. In systems supporting in memory computation, then if the data was transferred from the requester in encrypted form and not decrypted within the memory module, then in memory computation may not be possible. Another example where providing data decryption functionality at the memory module can be useful is where some integrity protection techniques for protecting data against tampering when stored out in the memory module may rely on a counter or other state value to provide temporal uniqueness, and some techniques for maintaining such counters may rely on the data being stored as plaintext rather than as encrypted data. One might expect that storing the data as plaintext in the memory would seem to reduce security, but in practice it is recognised that once the data has reached the memory storage then it may be relatively safe, as the greater vulnerability is at the interface where the data passes from the requester to the memory, so it can be sufficient that the data is encrypted at the requester and transmitted over the interface in encrypted form, but then decrypted by decryption circuitry in the memory module based on a decryption key or a further decryption key, and then stored to the memory storage location in decrypted form.

Hence, in some examples the key exchange mechanism described above can also be used to negotiate a key to be used for data decryption. The key used for data decryption could be the same decryption key as the key used for address decryption. Alternatively the data decryption could use a different decryption key from the address decryption. Unlike for address decryption, with data decryption, the memory apparatus may also have encryption circuitry to encrypt the data read from the memory storage location based on the decryption key or further decryption key, to generate encrypted data to be transferred back to the requester over the interface. If a symmetric encryption/decryption key is used then the same circuitry may act as both the decryption circuitry and the encryption circuitry. Alternatively any asymmetric encryption could be used where the decryption function and the encryption function are not the same. In this case the encryption circuitry may be different from the decryption circuitry. In practice a symmetric encryption/decryption technique may be sufficient and may be more feasible to implement within the budget constraints for a typical memory storage integrated circuit.

Hence, it is optionally possible to provide circuitry within the memory module to decrypt and encrypt data, in addition to decrypting the addresses as discussed above.

Another option may be that the interface may also receive commands from the requester, and control circuitry provided within the memory storage apparatus may control operation of the memory based on the commands. For example the control operation could be controlling a mode or power state of operation of the memory, activating or deactivating certain blocks of memory, or controlling certain timings of operation within the memory module to comply with requests by the requester. Also, the command could be a read or write command requesting that data is read or written. In some examples, the commands may be transmitted from the requester in encrypted form, and then decrypted by the decryption circuitry based on either the same decryption key used for the addresses or a different decryption key, which may be negotiated with the requester in the same way as for the address decryption key as discussed above. Hence the control circuitry may perform a control operation based on a decrypted configuration command obtained by the decryption circuitry.

The techniques discussed above can be applied to a range of memory storage technologies. However, in one example the memory storage circuitry may comprise at least one of: dynamic random access memory (DRAM), flash memory, and correlated electron random access memory (CERAM). These are examples of storage technologies for which a typical memory storage integrated circuit has very limited budget so that it is hard to implement cryptographic protocols for secure key exchange, and the techniques described above can be particularly useful for memory devices based on these types of storage technology. Of course, it will be recognised that these techniques could also be applied to other memory storage technologies, including memory storage technologies still to be developed in future which may suffer from similar problems to the examples given above.

In one example, the apparatus may be a memory module. Hence, the memory module may comprise the memory storage circuitry, interface, decryption circuitry, access control circuitry and configuration circuitry described above. A memory module may be a printed circuit board (PCB) on which one or more memory integrated circuits are mounted. In the example above with the separate configuration integrated circuit, the configuration integrated circuit may also be mounted on the memory module. Memory modules allow for easy installation and replacement of memory storage within a computing system. In one example, the memory module may be a dual in line memory module (DIMM).

The memory module may be provided as a standalone product, separate from the requester, and so the components of the requester are not an essential feature of the apparatus described above. For example the memory module may be manufactured independently, and then subsequently assembled into a system including the requester by a different party, so at the point when the memory module is manufactured and sold the requester device is not present.

However, the techniques discussed above can also be embodied in a system which comprises both the apparatus (e.g. memory module) described above and the requester itself. For example the requester could be a data processing integrated circuit or system on chip which comprises at least one processor.

Figure 1:
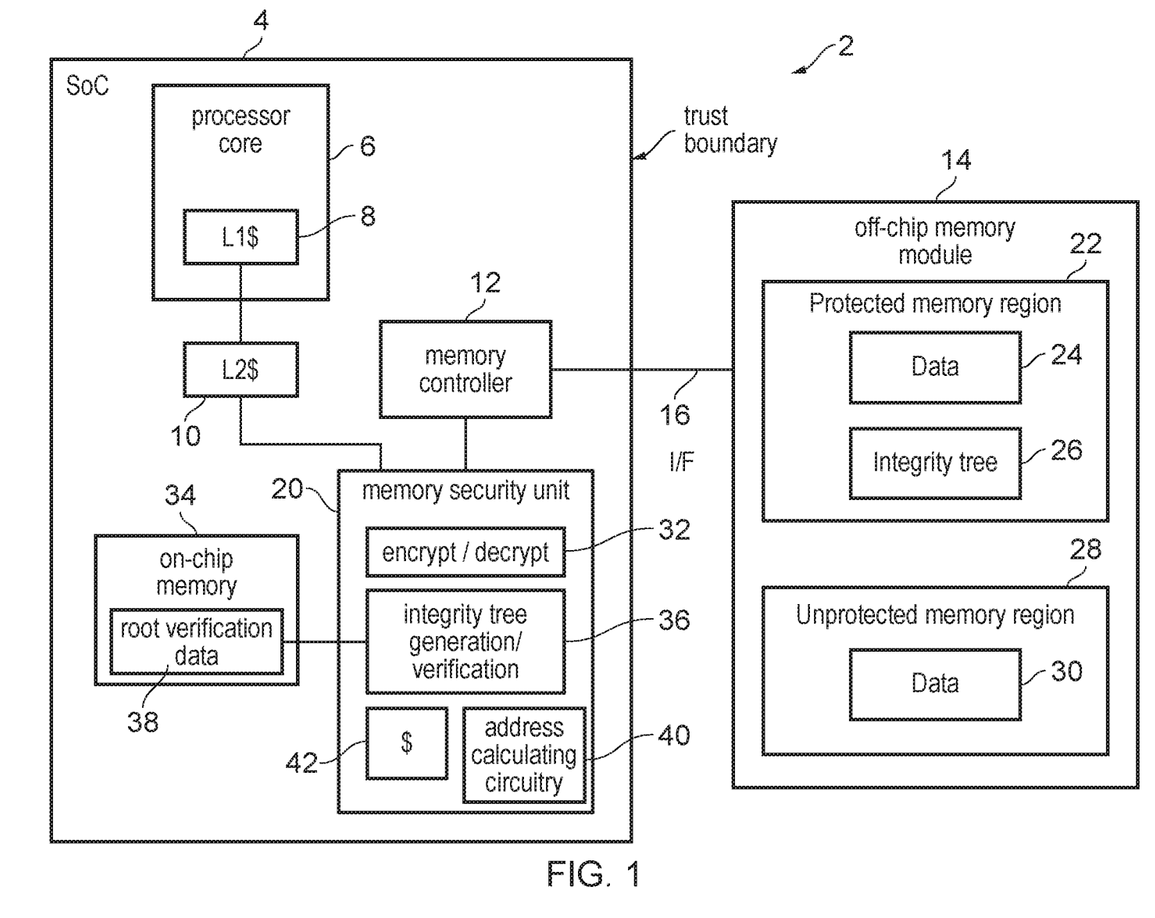
FIG. 1 schematically illustrates a data processing system comprising a data processing integrated circuit and an off-chip memory module.

FIG. 1 schematically illustrates an example of a data processing system 2, which comprises an integrated circuit or system on chip 4 which includes at least one processor core 6 for executing program instructions to carry out data processing operations. While FIG. 1 only shows one processor core, in some cases the system on-chip 4 may comprise multiple processors. Each processor core or processor core cluster may have a cache 8 (or multiple levels of cache 8, 10). A memory controller 12 acts as memory access circuitry for controlling access to an off-chip memory module 14 which is on a separate integrated circuit or PCB from the system on-chip 4. While accesses to data on-chip may be difficult to tamper with by an attacker, the edge of the system on-chip 4 may act as a trust boundary and any data passing beyond that boundary may be vulnerable to attack by intercepting data on the physical interface 16 between the memory controller 12 and the off-chip memory 14, or by reading or modifying the data while it is stored in the off-chip memory 14.

The system on chip 4 may include a memory security unit 20 provided for protecting data stored to a protected memory region 22 of the off-chip memory 14 from a malicious adversary who has physical access to the system and the ability to observe and/or replay the data or code being exchanged between the microprocessor and the off-chip system memory 14. The protected memory region 22 includes the data 24 to be protected as well as integrity tree metadata 26 used in the verification of the data 24. An unprotected memory region 28 may also be provided in the off-chip memory 14, and data 30 stored in the unprotected region is not protected by the memory security unit 20 and so is free to be accessed and modified by an attacker. In some implementations, the mapping of addresses to the protected and unprotected memory regions 22, 28 may be fixed by the hardware, so that it is not possible for an operating system or other software executed by the processor core 6 to vary which addresses are mapped to the protected memory region 22 or unprotected memory region 28. Alternatively, if the operating system controlling the address mapping can be trusted, the address mapping controlling which addresses are mapped to the protected region or the unprotected region may be varied by the processor under control of software, and so the protected and unprotected regions need not always map to the same physical locations in the off-chip memory 14. In some implementations, there may not be any unprotected memory region 28 provided in the off-chip memory 14—in this case the entire off-chip memory could be considered the protected memory region 22. Also, in some implementations the protected and unprotected memory regions 22, 28 could be mapped to physically separate memory modules.

The memory security unit 20 includes encryption/decryption circuitry 32 for encrypting data being written to the off-chip memory 14 and decrypting data read back from the off-chip memory. This provides privacy by preventing a malicious observer from seeing in the clear the data being read from or stored onto the off-chip memory 14. Encryption keys used by the encryption and decryption may be stored within an on-chip memory (e.g. SRAM) 34 on the system on chip or within the memory security unit 20 itself. Any known technique may be used for the data encryption and decryption, and any known approach for protecting the data encryption keys can be used.

The memory security unit 20 also includes integrity tree generation and verification circuitry 36. The verification circuitry 36 is responsible for maintaining the integrity tree 26 in the protected memory region and using it to check integrity of data stored in the off-chip memory 14. The integrity tree may provide a number of pieces of information for verifying whether data currently stored in the protected region 22 is still the same as when it was written to that region. The checking of data integrity can for example be achieved using message authentication codes (MACs) which may be generated from the stored data using one-way cryptographic functions such as AES-GCM or SHA-256, which use functions which make it computationally infeasible for an attacker to guess the authentication code associated with a particular data value by brute force when a secret key used to generate the authentication code is unknown. The authentication codes may be stored alongside the data 24 in the protected memory region 22 or in a separate data structure. The stored MAC for a data value is checked against a calculated MAC derived from the stored data using the same one-way function used to generate the stored MAC, and if a mismatch is detected between the stored MAC and calculated MAC then this may indicate that the data has been tampered with.

However, providing MACs alone may not be sufficient to prevent all attacks. Another type of attack may be a replay attack where a malicious person with physical access to the system stores a legitimate combination of the encrypted data and the MAC which was observed previously on the bus and then replays these onto the bus later with an intent to corrupt data at a given memory location with stale values so as to compromise the operation of the system. Such replay attacks can be prevented by adding temporal uniqueness to the MAC calculation function, e.g. by making the MAC depend not only on the data, but also based on state (e.g. a counter) which changes each time the data at a corresponding address is written. To reduce the volume of integrity data that has to be stored in the on-chip memory 34, the integrity tree 26 provides a tree structure of nodes where each leaf node of the tree provides integrity data (e.g. a MAC and/or counter) for use when verifying that one of the blocks of data 24 in the protected memory region 22 is valid and a parent node of a leaf node provides further integrity data for use when checking that the leaf node itself is valid. Parent nodes may themselves be checked using information from further parent nodes of the tree, and this continues as the tree is traversed up to the root of the tree which may then provide the ultimate source of verification. Root verification data 38 stored in the on-chip memory 34 may be used to verify that the root of the tree is authentic, either by storing the root node of the tree itself on on-chip, or by storing other information which enables the root node stored in the protected memory region 22 to be authenticated.

The memory security unit 20 may have address calculating circuitry 40 for calculating the addresses at which the nodes of the integrity tree 26 required for checking particular data blocks are located in the protected memory region 22. Optionally, the memory security unit 20 may also have a cache 42 for caching recently used nodes of the integrity tree for faster access than if they have to be read again from the off-chip memory 14. Alternatively, the memory security unit 20 could have access to one of the caches 10 which may also be used by the processor core 6 and so caching of data from the integrity tree 26 within the shared cache 10 could also help to speed up operation of the memory security unit 20.

Figure 2:
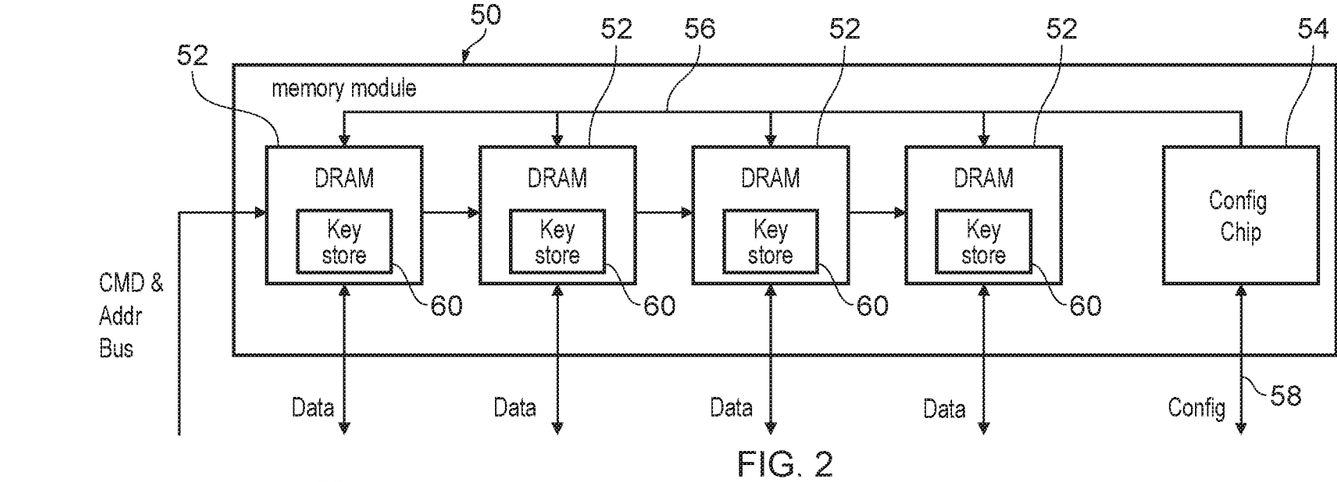
FIG. 2 illustrates an example of the memory module comprising a number of memory storage integrated circuits and a configuration integrated circuit.

FIG. 2 illustrates an example of a memory module 50 (e.g. a DIMM) which can be used as part of the off-chip memory 14 in the example of FIG. 1. In this example the memory module is used only for the protected memory region 22 within the off-chip memory 14. The unprotected memory region 28 may be mapped to a separate memory module which does not have the decryption functionality described below. It will be appreciated that in other examples both the protected and unprotected memory regions could be within the same memory module.

The memory module 50 of FIG. 2 includes a number of memory storage integrated circuits 52 and a configuration integrated circuit 54. In this example the memory storage integrated circuits (or chips) 52 are DRAM chips which comprise memory storage implemented as dynamic random access memory, but it will be appreciated that other memory storage technologies could also be used. While FIG. 2 shows four DRAM chips 52 for sake of example, it is possible to provide a different number (e.g. 8 or 16). The configuration chip 54 is a separate integrated circuit from the memory storage chips 52, and an internal bus 56 is provided for communication between the configuration chip 54 and the respective memory storage chips 52. For example the bus 56 may be an I2C bus or a bus provided according to other bus protocols. The configuration chip 54 performs communication with the system on chip 4 over a communication interface 58 which may be on the same physical interface 16 as the data, address and command communications exchanged between the system on chip 4 and the memory module 50. Alternatively a separate communications channel could be provided for configuration communications 58 compared to the data, address and commands for memory accesses. As shown in FIG. 2, the memory storage integrated circuits 52 each include a key store 60 for storing a decryption key for address decryption.

Figure 3:
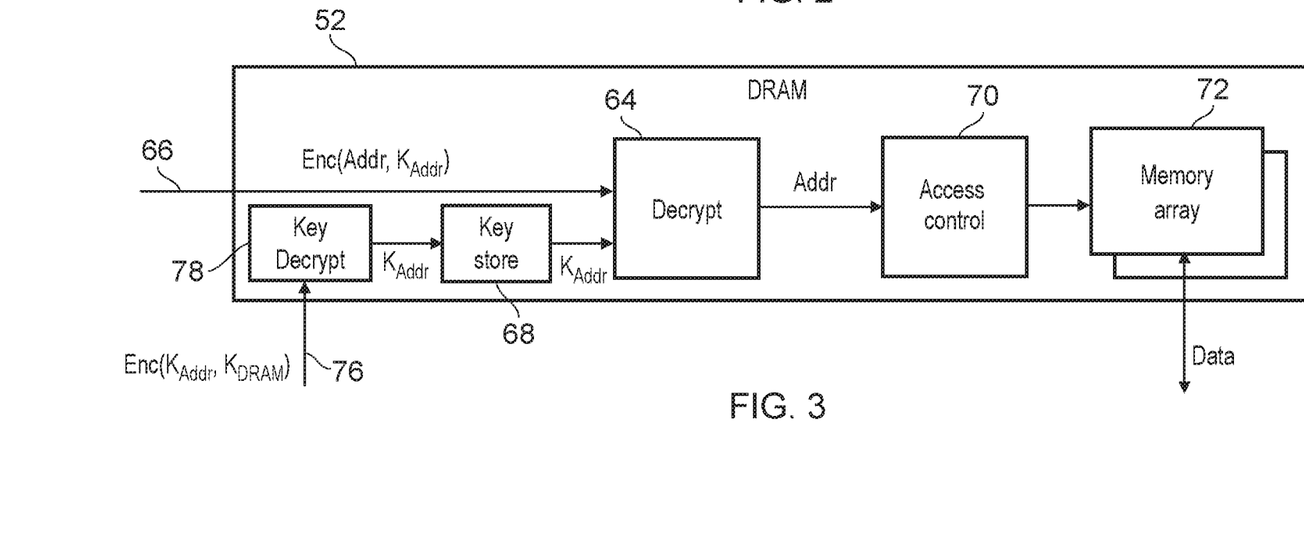
FIG. 3 shows in more detail one of the memory storage integrated circuits of FIG. 2.

FIG. 3 shows in more detail one of the memory storage integrated circuits 52 as in the example of FIG. 2. It will be appreciated that each of the DRAM chips in the example of FIG. 2 can have a similar design as shown in FIG. 3. Alternatively there could be some additional DRAM chips implementing the unprotected memory region 28 which may omit the key store 60 and decryption circuitry 78, 64 of FIG. 3.

For those DRAM chips which do support address decryption, as shown in FIG. 3 the DRAM chip 52 includes decryption circuitry 64 which receives an encrypted address 66 from the system on chip acting as requester 4 via the interface 16, and decrypts the encrypted address using a decryption key $K_{Addr}$ obtained from the key store 68. Access control circuitry 70 is provided to control access to the memory storage array 72. The memory storage array 72 includes the actual storage cells used to store the data. Hence, the access control circuitry 70 selects a particular memory storage location within the memory array 72 based on the decrypted address Addr obtained by the decryption circuitry 64 by decrypting the encrypted address 66 received from the requester 4. By enabling addresses to be transmitted over the interface 16 between the requester 4 and the memory module 50 in encrypted form, this avoids attackers learning information about the pattern of addresses accessed by the requester 4 from a side channel gained by observing the addresses on the interface 16.

The configuration chip 54 is responsible for key exchange processing to negotiate, with the requester, the particular decryption key $K_{Addr}$ to be used for address decryption. The configuration chip 54 provides the obtained decryption key to the memory storage integrated circuits 52 over the internal bus 56. The communication over the bus 56 is protected against external attacker access by encrypting the decryption key using a shared symmetric key $K_{DRAM}$. Hence, the decryption key is received as an encrypted decryption key 76 from the configuration chip 54, and is decrypted by key decryption circuitry 78 using the previously shared key $K_{DRAM}$ and then the decrypted key $K_{Addr}$ is stored in the key store 68 ready for subsequent address decryption.

Figure 4:
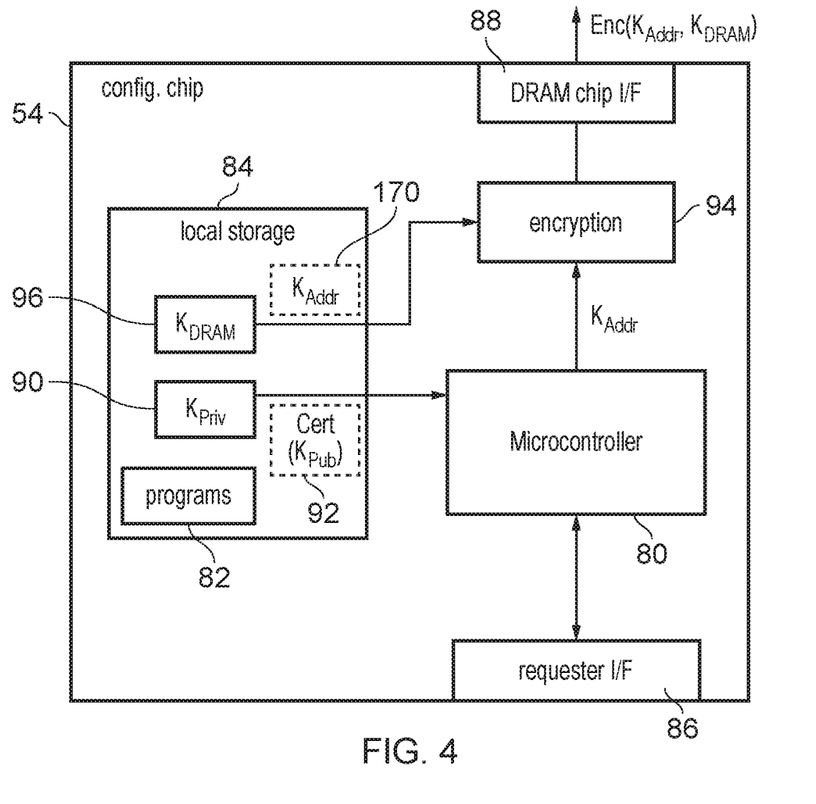
FIG. 4 shows in more detail the configuration integrated circuits of FIG. 2.

FIG. 4 shows in more detail the configuration chip 54 shown in FIG. 2. The chip includes a microcontroller 80 which executes programs 82 stored in local storage circuitry 84 within the configuration chip 54. The microcontroller 80 can communicate with the requester 4 over a requester interface 86 and with the DRAM chips 52 over a DRAM chip interface 88 via the internal bus 56. The configuration chip 54 is responsible for performing cryptographic operations for authenticating the memory module 50 to the requester 4 and obtaining the address decryption key $K_{Addr}$ through a secure key negotiation protocol performed with the requester 4.

As shown in FIG. 4, the local storage 84 of the configuration chip 54 stores the symmetric key $K_{DRAM}$ 96 which is used to protect the transmission of the address decryption key $K_{Addr}$ over the bus 56. The symmetric key $K_{DRAM}$ may be a pre-shared key for the configuration chip to communicate with the DRAM chips, which may be generated after assembly and test during the process of building the memory module.

Also, the local storage 84 includes an asymmetric private key 90, $K_{Priv}$, which corresponds to a public key $K_{Pub}$ which is associated with a certificate 92 which can be used to authenticate the module 50 using a public key infrastructure. As shown in FIG. 4, the certificate 92 could be stored within the local storage 84 of the configuration chip 54, but this is not essential and in other examples the requester 4 which wants to verify the identity of the memory module 50 could obtain the certificate 92 by downloading it from a certificate server maintained by the manufacturer of the module 50 or a certifying authority for example. The certificate 92 is signed by the manufacturer of the memory module 50 or by a certifying authority associated with the manufacturer, and can be used to authenticate the module 50 and negotiate for the key exchange in order to obtain the address decryption key $K_{Addr}$.

As shown in FIG. 4, the configuration chip 54 also includes encryption circuitry 94 for encrypting the address decryption key $K_{Addr}$ using the shared symmetric key $K_{DRAM}$ 96 for transmission to the DRAM chips 52. Alternatively, the functionality of the encryption circuitry 94 could be provided in software using program code 82 executed by the microcontroller 80.

In one example, the module 50 is a smart DIMM in which the active secure microcontroller unit (MCU) 54 is provided instead of a passive EEPROM (electrically erasable programmable read-only memory) chip, which would normally be provided on a typical DIMM to provide configuration data (e.g. timings, manufacturer data). Alternatively, the MCU 54 could be provided with the EEPROM. This MCU 54 stores a certificate 92 that is used to authenticate the DIMM. This certificate is programmed when the DIMM 50 is assembled and signed by the manufacturers certificate authority. The host system can then use standard cryptographic protocols to authenticate the secure MCU 54 and decide whether it trusts the manufacturer.

In addition to the certificate, the secure MCU 54 stores one or more pre-shared keys 96 that are used to authenticate the DRAM chips 52 and exchange a symmetric session key that is shared with the host (requester) 4. Also, the secure MCU 54 may optionally support a set of symmetric keys to be used to communicate with the host in subsequent communications after an asymmetric authentication occurs the first time the host boots with the DIMM.

An example of a boot process may be as follows:
1. Host CPU 4 authenticates the secure MCU 54 on the DIMM 50, using asymmetric cryptographic protocols.
2. Host CPU 4 and MCU 54 exchange symmetric session keys (which are randomly generated by the host).
3. MCU 54 uses the pre-shared symmetric key(s) (shared between MCU 54 and DRAM chips 52) to distribute the session key to the DRAM chips 52 on the DIMM 50.

Note that all of the steps above only need to be performed when booting with a new DIMM. To speed up the boot sequence, the host 4 and the MCU 54 may decide to preserve their session keys across boots. Challenge-response mechanisms can then be used to determine if the DIMM has been replaced without going through the full asymmetric key exchange. This allows the time consuming asymmetric authentication to occur only on the first boot with a new DIMM 50.

Figure 5:
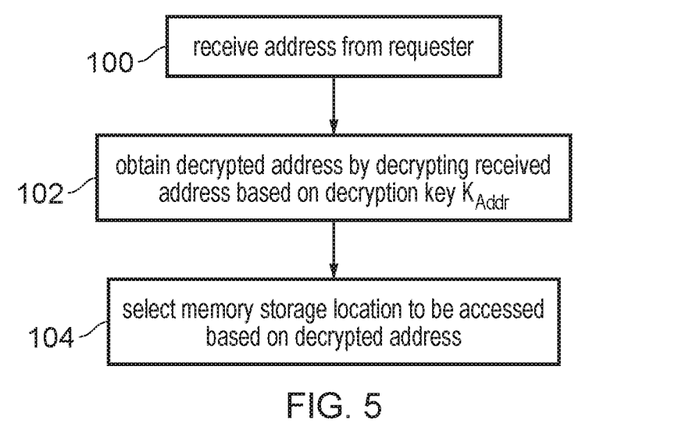
FIG. 5 is a flow diagram showing a method of controlling access to memory storage circuitry based on address decryption.

FIG. 5 is a flow diagram showing a method of processing addresses at the memory storage integrated circuit 52. At step 100 an address 66 is received from the requester 4 over the interface 16, where the address is received in an encrypted form. At step 102 the decryption circuitry 64 obtains a decrypted address (Addr) by decrypting the received address based on the decryption key $K_{Addr}$. At step 104 the access control circuitry 70 selects a particular memory storage location within the memory array 72 to be accessed, with the memory storage location being selected based on the decrypted address obtained by the decryption circuitry 64. The memory can then read or write the selected location and return a response to the requester 4.

Figure 6:
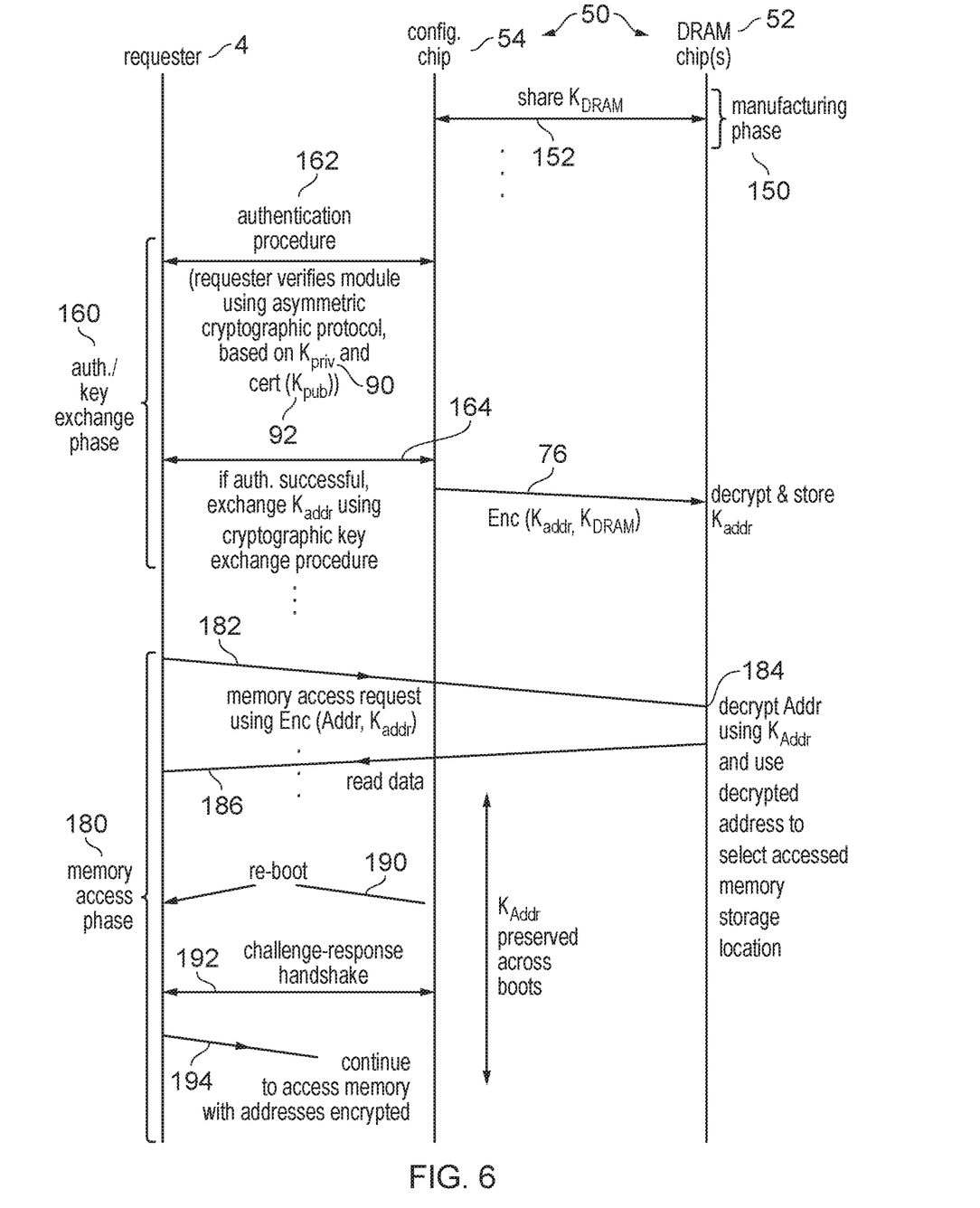
FIG. 6 illustrates exchange of information between a requester, the configuration integrated circuit and the one or more memory storage integrated circuits.

FIG. 6 illustrates various steps in the operation of the memory module at different stages of its life cycle. Initially during a manufacturing phase 150 when the memory module 50 is being assembled in the factory, once the configuration chip 54 and memory storage chips 52 have been mounted on the printed circuit board, a key sharing step 152 is performed to share the symmetric key $K_{DRAM}$ between the configuration integrated circuit 54 and the memory storage integrated circuits 52, for later protection of keys exchanged on the bus 56. For example the sharing could be implemented by injecting a key from the manufacturer into the configuration chip 54 and each memory storage chip 52, or by controlling the configuration chip to generate the key $K_{DRAM}$ and transmit it to the DRAM memory storage chips 52 while the module 50 is in a secured location within the manufacturer's premises, or by simultaneously triggering both the configuration chip 54 and the memory storage chips 52 to perform a key generation process based on shared seed data injected by the manufacturer during the manufacturing phase 150. It will be appreciated that any technique for embedding the same key into multiple chips within a manufacturing environment can be used at this stage.

Subsequently, the memory module is commercialised and sold to a manufacturer of the overall data processing system 2 as shown in FIG. 1 where is it built into an electronic device comprising the system on chip 4 acting as the requester and the memory module 50 acting as part of the off-chip memory 14. Once the device is operational, the memory module 50 can be used for storing data off-chip from the system on chip 4.

In an initialisation phase, e.g. performed the first time the requester 4 wants to store data off-chip to the memory module while protecting it against attackers, the requester 4 and the memory module 50 enter an authentication and key exchange phase 160. This comprises an authentication procedure 162 where the requester 4 and the configuration chip 54 on the module 50 use asymmetric cryptographic protocols to perform authentication based on the private key $K_{Priv}$ 90 stored in the local storage 84 of the configuration chip 54 and the public key certificate 92 which the requester 4 can either obtain from the configuration chip 54 itself or from a remote server operated by a certifying authority or the manufacturer for example. For example, any PKI based asymmetric cryptographic protocol, e.g. based on X.509 certificates, could be used for the authentication procedure. The cryptographic primitives required for this authentication to be secure may be relatively processor intensive and need a certain amount of processing logic, and so by performing this on the microcontroller 80 of the configuration chip 54 this enables standard budget-constrained memory storage integrated circuits 52 to be used for the memory storage itself. In the authentication procedure, the requester 4 uses the certificate 92 to verify that the module 50 has possession of the corresponding private key 90, and hence that any attributes attested to by the certificate 92 can be trusted. For example the certificate can be signed by a key associated with the manufacturer or a certified authority, and verified by the signer's public key, to ensure that the certificate has not been replaced with a certificate from another provider. The certificate can be used to attest to the identity of the manufacturer, particular details of the circuits components of the module 50 or any other information that may be needed for the requester 4 to verify whether it will trust the module 50 so that it will be prepared to transmit its data and addresses to the module 4.

If the authentication procedure 162 is successful then at step 164 a key exchange procedure is performed, again protected by cryptographic techniques, to exchange the shared symmetric address decryption key $K_{Addr}$ which will subsequently be used for decrypting addresses during memory accesses. Any key exchange protocol can be used, such as for example Diffie-Hellman or other techniques. In some cases the initial secure key exchange may be to exchange a session key which is used as a single use key only for the current session, and then the address decryption key may subsequently be exchanged protected by encryption using the session key previously negotiated in the key exchange.

Hence, through performing the key exchange procedure 164, the configuration chip 54 obtains the address decryption key $K_{Addr}$, and optionally may store it as a local copy 170 within its local storage 84 as shown in FIG. 4. The encryption circuitry 94 or the microcontroller 80 of the configuration chip 54 encrypts the address decryption key $K_{Addr}$ using the previously shared symmetric key $K_{DRAM}$ and transmits the encrypted address decryption key 76 to the memory storage chips 52 over the bus 56. The key decryption circuitry 78 in the memory storage chips 52 decrypts the received key 76 using the preshared key $K_{DRAM}$ and stores the decrypted key into the key store 68. Now, the memory module 50 is ready to receive memory access requests with encrypted addresses.

During a memory access phase 180 the requester 4 then issues read or write memory accesses to the memory module 50. At step 182 a memory access request is issued which specifies an encryptable address identifying the memory storage location to be accessed. At step 184 the decryption circuitry 64 received the encrypted address and decrypts it using the previously agreed key $K_{Addr}$ and then uses the decrypted address to select the storage location in the memory array 72 to be accessed. If the requested memory access is a read access then at step 186 the data read form the selected storage location is returned to the requester 4. If the request was a write and write data supplied with the memory access request 182 would be written to the selected storage location, and a write response may be returned to confirm the write has been serviced.

As shown in FIG. 6, the address decryption key $K_{Addr}$ may be preserved across boots, so that even if at step 190 the processing system 2 is reset or powered down and then reboots, the full authentication and key exchange phase 160 does not need to be repeated as the previously agreed address decryption key has been preserved. For example the key could be preserved within the key store 68 within the memory storage chips 52 or within the local storage 84 within the configuration chip 54.

However, after a reboot if a previously preserved key is to be used for address decryption then the requester 4 may wish to check that an attacker has not switched the memory module 50 connected on the interface 16 between boots. Hence, a challenge-response handshake 192 may be performed where the requester 4 sends a challenge to the configuration chip 54 and the configuration chip 54 responds with a corresponding response. The challenge-response handshake may use any protocol designed for the configuration chip 54 to be able to verify to the requester 4 that it is the same chip with which the previous authentication and key exchange protocol 160 was performed. For example, the configuration chip 54 could use the private key 90 or the previously agreed address decryption key 170 to encrypt a message which the requester 4 could verify using the corresponding public key 92 or the previously agreed address decryption key 170. Alternatively, during the authentication and key exchange phase 160 a shared piece of information may be exchanged and stored at the memory module 50, and this previously shared information could be used in the response to the challenge to verify that the module 50 is still the same as before. Hence, if the challenge-response handshake 192 is carried out successfully and the requester 4 verifies that the module 50 is still the same module as the module with which the authentication procedure 162 and key exchange procedure 164 were performed, then at step 194 access to memory may continue, with the addresses encrypted based on the previously agreed key $K_{Addr}$ and there is no need to repeat the authentication and key exchange phase 160. Alternatively if the challenge-response handshake 192 is unsuccessful, then the authentication and key exchange phase 160 may be repeated.

It is not essential for the address decryption key to be preserved across boots, and in other examples the authentication and key exchange phase 160 could be performed each time the system 2 is booted.

The above examples use the address decryption key $K_{Addr}$ only for encrypting the addresses, and from the point of view of the memory module 50 the command and data received from the requester may be processed without decryption. This does not mean that the data is in the clear, but it may be that any encryption and decryption of the data is handled solely within the encryption/decryption unit 32 of the memory security unit 20 in the requester 4. Hence, the module 50 does not itself need to deal with data decryption or encryption.

Figure 7:
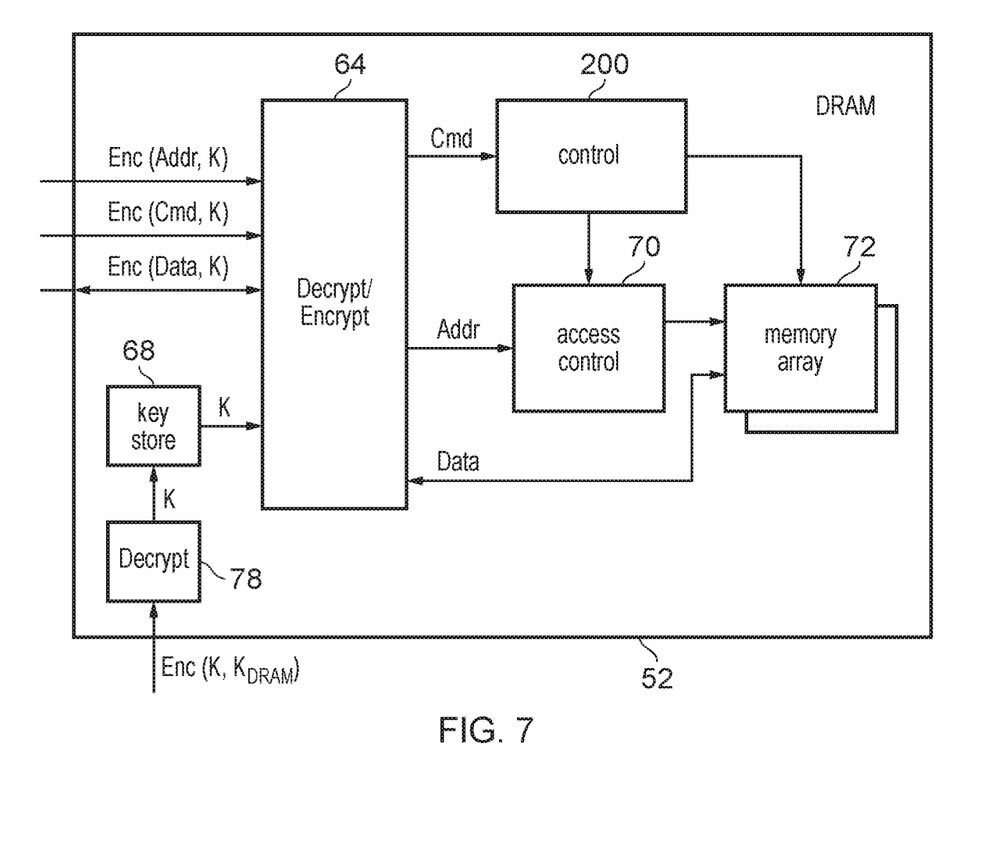
FIG. 7 illustrates a second example of a memory storage integrated circuit in which data and/or commands exchanged between the requester and the memory storage are encrypted, similar to the address in the earlier example.

However, as shown in the example of FIG. 7, in other implementations the module 50 may have a memory storage integrated circuit 52 which also supports at least one of command decryption and data encryption/decryption. If command decryption is supported then commands received from the requester 4 (e.g. write or read commands, configuration commands, maintenance commands, power state control commands, etc.) may be received in encrypted form. Control circuitry 200 may control operation of the access control circuitry 70 or the memory array 72 or other elements of the DRAM chip 52 in response to the commands. In this example, the same decryption key K is used for decrypting the commands as is used for the addresses, and so a similar approach can be used. The key exchange protocols performed to obtain the key K may be performed in the same way as discussed above. The decryption circuitry 64 decrypts commands in a similar way to decrypting addresses.

In other examples, data encryption and decryption may also be supported so that the decryption circuitry 64 also acts as encryption circuitry. In this case the data written to the memory module 50 from the requester 4 is transmitted over the interface 16 having been encrypted at the memory security unit 20 using an encryption key K. For ease of explanation, it is assumed that this key is the same as the address decryption key used for decrypting the addresses. Other examples could use different keys for address data decryption. Hence, this key K can be negotiated with the requester 4 using the configuration chip 54 in the same way as discussed above.

Hence, the decryption circuitry 64 may decrypt encrypted data received from the requester and the decrypted data is written to the memory array 72 under control of the access control circuitry 70. The memory storage location to be written is selected based on the decrypted address obtained by the decryption circuitry 64. When data is read out from the memory array 72 at a storage location selected based on the decrypted address, the plaintext data read from the memory array is encrypted at the encryption circuitry 64 and then the encrypted data is transferred over the interface 16 back to the requester 4. In this example, a symmetric key K is used for the data encryption and decryption so that the encryption/decryption function is the same used both on encryption and decryption. Alternatively, different decryption and encryption functions which correspond to each other could be used. By supporting the ability for the memory module 50 to decrypt data sent over the channel 16 in encrypted form, this means that data can be stored as plaintext in memory array 72, which may open up opportunities to perform in-memory computation or to use more flexible models for managing the integrity tree 36 based on counters intended to provide temporal uniqueness, as this may allow counters to be assigned at a wider granularity than individual blocks of addresses to be encrypted.

Hence, in summary by providing support on the memory module 50 for performing authentication based on asymmetric cryptographic protocols it is possible to securely negotiate exchange of a key with the module 50 so that the requester 4 can protect its addresses from access by an attacker, to reduce side channel attacks aimed at probing the operation of the processor 6 based on observing the address sequences issued out to memory. This improves security.

In the examples shown above, the communication between the configuration chip 54 and the memory storage chips 52 is performed via the internal bus 56. However, this is not essential. As the decryption key $K_{addr}$ is sent to the memory storage chips 52 in encrypted form, this means it is also possible to transmit the decryption key $K_{addr}$ from the configuration chip 54 to the memory storage chips 52 via the requester 4. Hence, messages that the configuration chip 54 wants to send to the memory chips 52 could be transmitted to the requester 4 that then relays them to the memory chips 52, using the bus 16 between the memory module 14 and the requester 4. The requester 4 and bus 16 may support a given set of commands that the requester 4 can send to the memory module 50, e.g. including a read command, write command, precharge command, etc. This set of commands could be expanded to include one or more "forwarding" commands which the memory controller 12 of the requester 4 could use to forward messages (including configuration commands or data) between the configuration chip 54 and the memory storage chip 52. Such forwarding commands may be used to forward the address decryption key $K_{addr}$ (protected against eavesdropping by encryption based on the shared key $K_{DRAM}$). The forwarding commands effectively provide a "virtual" version of the internal configuration bus 56 shown in the example of FIG. 2 above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   memory storage circuitry comprising a plurality of memory storage locations to store data, in which the memory storage circuitry comprises at least one memory storage integrated circuit;
   an interface to receive an address from a requester;
   decryption circuitry to obtain a decrypted address by decrypting, based on a decryption key, an address received from the requester, in which the decryption circuitry is provided on said at least one memory storage integrated circuit;
   access control circuitry to select, based on the decrypted address obtained by the decryption circuitry, a memory storage location of the memory storage circuitry to be accessed; and
   configuration circuitry to obtain the decryption key by performing a cryptographic key exchange procedure with the requester, and to provide the decryption key to the decryption circuitry, in which the configuration circuitry is provided on a configuration integrated circuit separate from said at least one memory storage integrated circuit, and in which the configuration integrated circuit is configured to protect transmission of the decryption key to said at least one memory storage integrated circuit by encrypting the decryption key based on a symmetric key shared between the configuration integrated circuit and said at least one memory storage integrated circuit.

2. The apparatus according to claim 1, in which the configuration circuitry comprises a microcontroller.

3. The apparatus according to claim 1, in which the cryptographic key exchange procedure comprises an authentication procedure performed between the requester and the configuration circuitry to authenticate an identity of the apparatus or a manufacturer of the apparatus.

4. The apparatus according to claim 3, in which the authentication procedure is based on asymmetric key cryptography.

5. The apparatus according to claim 3, in which, in the authentication procedure, the configuration circuitry is configured to provide an authentication response based on a private key stored in local storage circuitry associated with the configuration circuitry, the private key being verifiable using an attestation certificate providing a public key corresponding to the private key.

6. The apparatus according to claim 5, in which the attestation certificate is signed by the manufacturer of the apparatus or a certifying authority associated with the manufacturer of the apparatus.

7. The apparatus according to claim 1, in which at least one of the configuration circuitry and the decryption circuitry is configured to preserve the decryption key obtained in the cryptographic key exchange procedure in local storage circuitry, to enable subsequent addresses received on the interface to be decrypted without needing to repeat the cryptographic key exchange procedure.

8. The apparatus according to claim 7, in which the decryption key is preserved across successive boot operations.

9. The apparatus according to claim 7, in which in response to a challenge request from the requester, the configuration circuitry is configured to provide a challenge response for verifying to the requester that the apparatus is the same apparatus with which the requester previously performed the cryptographic key exchange procedure.

10. The apparatus according to claim 1, in which the memory storage circuitry comprises a plurality of memory storage integrated circuits, and each of said plurality of memory storage integrated circuits comprises said decryption circuitry and the access control circuitry.

11. The apparatus according to claim 10, in which the plurality of memory storage integrated circuits share the same decryption key for decrypting addresses received on the interface.

12. The apparatus according to claim 1, in which the interface is configured to receive encrypted data from the requester;
the decryption circuitry is configured to decrypt the encrypted data based on the decryption key or a further decryption key; and
the access control circuitry is configured to update a memory storage location based on decrypted data obtained by the decryption circuitry.

13. The apparatus according to claim 1, in which the interface is configured to receive a command from the requester;
the decryption circuitry is configured to decrypt the command based on the decryption key or a further decryption key; and
the apparatus comprises control circuitry to perform a control operation based on a decrypted command obtained by the decryption circuitry.

14. A system comprising:
the apparatus of claim 1; and
the requester.

15. The system of claim 14, in which the requester comprises a data processing integrated circuit comprising at least one processor.

16. A method for controlling memory storage circuitry comprising a plurality of memory storage locations to store data, in which the memory storage circuitry comprises at least one memory storage integrated circuit; the method comprising:
obtaining a decryption key by performing a cryptographic key exchange procedure with a requester;
protecting transmission of the decryption key to said at least one memory storage integrated circuit by encrypting the decryption key based on a symmetric key shared between a configuration circuitry provided on a configuration integrated circuit separate from said at least one memory storage integrated circuit;
receiving an address from the requester;
obtaining a decrypted address by decrypting, based on the decryption key, an address received from the requester; and
selecting a memory storage location of the memory storage circuitry to be accessed based on the decrypted address.

17. An apparatus comprising:
memory storage circuitry comprising a plurality of memory storage locations to store data;
an interface to receive an address from a requester;
decryption circuitry to obtain a decrypted address by decrypting, based on a decryption key, an address received from the requester;
access control circuitry to select, based on the decrypted address obtained by the decryption circuitry, a memory storage location of the memory storage circuitry to be accessed; and
configuration circuitry to obtain the decryption key by performing a cryptographic key exchange procedure with the requester, and to provide the decryption key to the decryption circuitry;
in which at least one of the configuration circuitry and the decryption circuitry is configured to preserve the decryption key obtained in the cryptographic key exchange procedure in local storage circuitry, to enable subsequent addresses received on the interface to be decrypted without needing to repeat the cryptographic key exchange procedure, and in which the decryption key is preserved across successive boot operations.

* * * * *